April 17, 1934.   J. J. BRIGHT ET AL   1,954,786
STRAY LIGHT ELIMINATING AND PICTURE CABINET ENLARGING DEVICE
Filed March 12, 1931
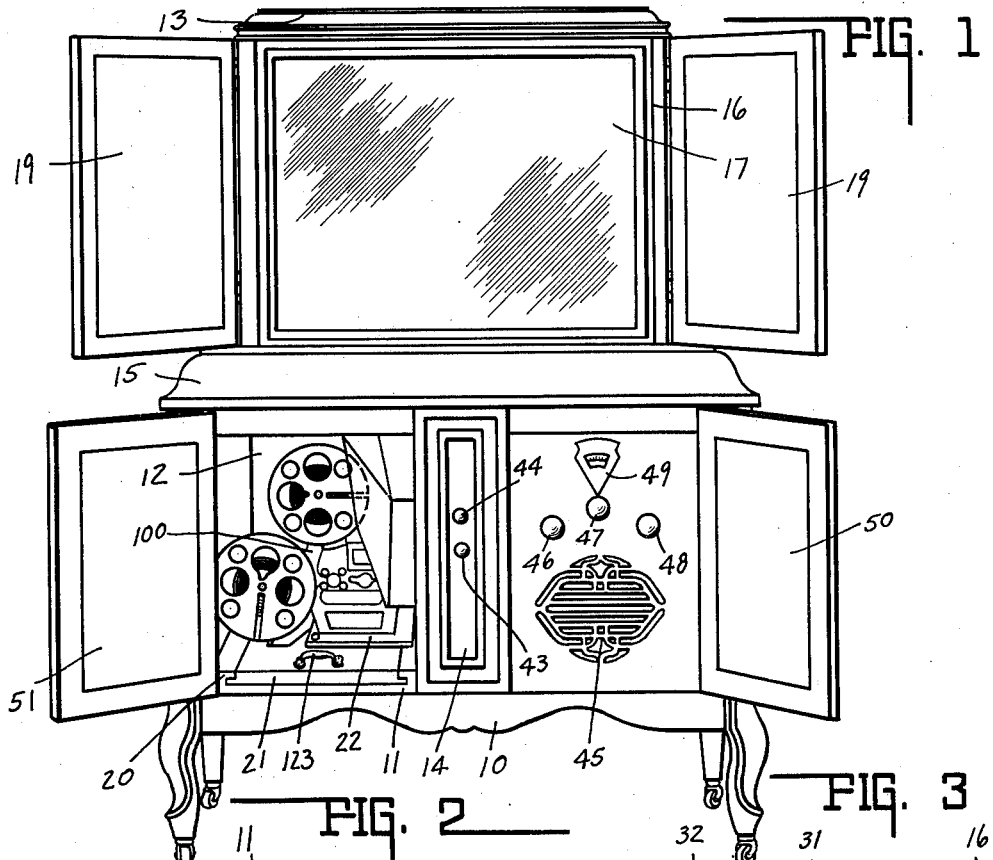
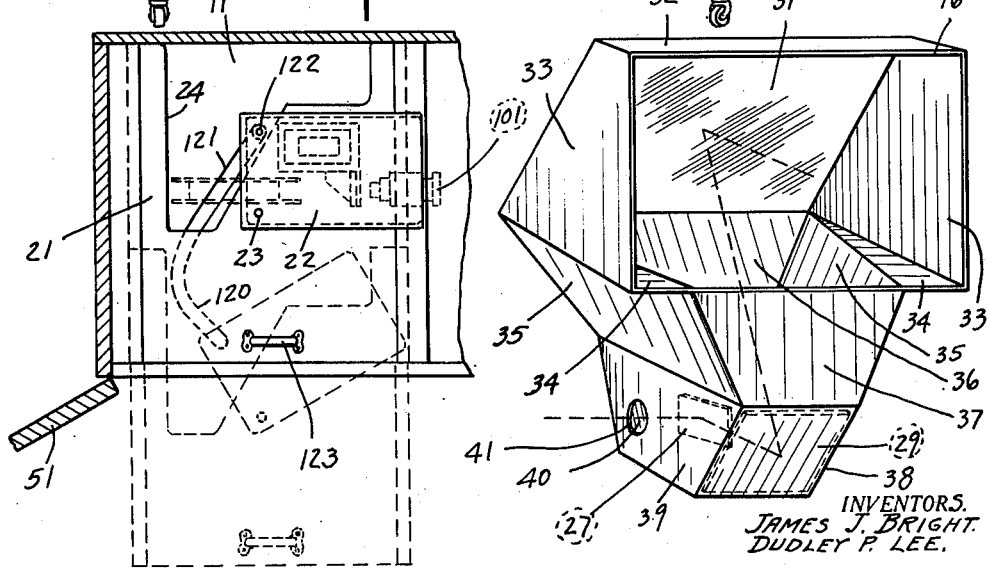
INVENTORS.
JAMES J. BRIGHT.
DUDLEY P. LEE.
BY
Lockwood Lockwood Goldsmith & Galt
ATTORNEYS.

Patented Apr. 17, 1934

1,954,786

UNITED STATES PATENT OFFICE 1,954,786

STRAY LIGHT ELIMINATING AND PICTURE CABINET ENLARGING DEVICE

James J. Bright and Dudley P. Lee, Indianapolis, Ind.

Application March 12, 1931, Serial No. 522,014

7 Claims. (Cl. 88—24)

This invention relates to a combination cabinet type radio and moving picture device.

This application is a continuation-in-part of the co-pending application, Serial No. 515,170, filed February 12, 1931, and entitled Moving picture cabinet enlarging device.

The chief object of the present invention is to accomplish all the objects set forth in the before-mentioned application but in addition thereto to eliminate all possibility of stray light affecting the image production, to eliminate all possibility of interference in the movement of the moving picture projector into and out of the enclosing cabinet, and to incorporate in a single cabinet radio and moving picture producing devices.

One feature of the invention consists in the relatively fixed image enclosing stray light eliminating casing.

Another feature of the invention consists in the exterior mounting of the projector controls.

A further feature of the invention consists in the symmetrical balanced arrangement of the several parts of the combination cabinet type devices in a cabinet.

Another feature of the invention consists in the adjustable mounting of the projector for casing clearance in the movement of the projector to and from film replacing position.

The full nature of the invention will be understood from the accompanying drawing and the following description and claims:—

In the drawing, Fig. 1 is a perspective view of one embodiment of the invention showing the doors opened, exposing the screen, a radio adaptation, the exteriorly positioned moving picture control and the moving picture projector in projecting position.

Fig. 2 is a transverse sectional view taken in a horizontal plane showing the moving picture projector support in full lines in the projecting position and in dotted lines in the partially removed position for film replacement and projection machine adjustment when desired.

Fig. 3 is a perspective view of the light enclosing casing with a pair of reflecting mirrors illustrated in dotted lines therein to more clearly illustrate the invention.

In the drawing, 10 indicates the base of a cabinet having the bottom 11, the back 12, the top 13 and the front that is divided for ornamentation only into four parts. One part 14 constitutes the central lower panel and exposedly mounted thereon is a control member 43 and another control member 44. The first or upper control member 44 preferably controls the light illumination in the projector device for forming the images, while the lower control member 43 is arranged to control the motive power of the device. The connections between the members 43 and 44 and the projector have been omitted, since they may be of the conventional type.

The cabinet, as stated, is divided into an upper portion and a lower portion for ornamentation only and the intermediate portion is indicated by the numeral 15. The entire upper portion of the cabinet is open at its front, as at 16, and the said opening is closed by a translucent screen 17 which may be fixedly or detachably mounted therein. The cabinet is closed by the top 13 and the screened opening may also be closed by a pair of vertically hinged panels or doors 19. These doors, while shown hingedly mounted, may, however, be slidably mounted as is the common practice in the cabinet art.

In the lower part of the cabinet construction and centrally positioned therein, is a casing to which reference will be had hereinafter. To one side of the same and the right side, as illustrated in Fig. 1, there is provided a so-called radio construction having the grilled opening 45 for the discharge of sound, the illuminated dial construction 49 for locating the desired station, the control member 47 for controlling the circuit to obtain the desired station, the tuning control 46 and the power control 48. All of this radio device is herein conventionally illustrated and any desired or preferred type of radio mechanism may be substituted therefor. The radio equipment and the panel is preferably covered by a vertically hinged door 50, so that the cabinet may be completely closed when desired.

Mounted on the base 11 is a plate 21 which is slidably supported in the angle shaped rails or guide members 20. The plate or platform 21 includes a cut out portion 24 and pivotally supported at 23 upon said plate is a projector base support member 22, the projector being of the motion picture type and being indicated in said figures by the numeral 100. The base or support member 22 has depending therefrom a roller 122—see Fig. 2—and said roller is positioned in a slot having a long curved portion 121 and a shorter curved portion 120 of greater curvature. The plate 21 includes the handle portion 123. When the handle portion 123 is moved outwardly, the roller 122, due to the direction of the slot 121, causes the plate 22 to pivot at 23 on the plate 21, so that the projection device is gradually retracted toward the side wall of the cabinet in its outward removal and away from the central portion of the cabinet for clearance purposes in order to clear the door 51 provided to close the projector receiving portion of the cabinet. Portion 120 tilts the plate 22 in the return direction in the continued withdrawal of the plate 21 until the final position, indicated by the dotted lines in Fig. 2, is obtained. The primary reason for this final movement is not necessarily to clear the door opening, because the cabinet may be so made that the same may not be required, but the chief purpose of this movement is to position the projector so that film replacement or adjustment of projector parts may be more readily effected.

The projector focusing lens structure is indicated by the numeral 101 and the same discharges a conical arrangement of light rays that are capable of forming an image. The axis of this projecting system, as will be evident from a comparison of Figs. 1 and 2, is horizontal and substantially parallel to the substantially vertical screen 17 but offset therefrom both rearwardly and downwardly.

The casing previously mentioned is illustrated in perspective in Fig. 3 and the lower left hand portion of which is shown in Fig. 1. The upper portion of the casing includes the top 32 which has a width from side to side substantially equal to the width of the screen and a depth that is materially less than the depth of the cabinet. The back of the upper portion of the casing herein is shown inclined upwardly and forwardly and the forward face thereof fixedly mounts a flat reflecting mirror 31, the front or first surface of which constitutes the reflecting surface. The sides of the upper portion of the casing are indicated by the numeral 33, while the bottom of the upper portion, which is divided, is indicated by the numeral 34.

The lower part of the casing is divided into two parts, a lower portion and an intermediate portion having the substantially vertical front 37 positioned thus for convenience of construction only and two upwardly and rearwardly directed, as well as outwardly directed sides 35 which terminate in the upwardly and rearwardly directed back portion 36.

The lower portion of the casing includes a downwardly and rearwardly inclined front 38, upon the rear surface of which is mounted a flat first surface smaller mirror 29. The inclination of the side 36 is such that if projected downwardly and forwardly, it would substantially intersect the bottom edge of the front 38. Two inwardly inclined, rearwardly directed sides 39 join the sides 35 and also the front 38. The back of the lower portion of the casing is closed by the portion 40 seen, in Fig. 3, through the opening 41 near the rear and lower left hand side of said casing. The bottom of the casing is not illustrated, but extends from the bottom of the front portion 38 to the bottom of the back portion 40, thereby forming a completely closed casing except for opening 41 and the opening 16 in the front face thereof.

The mirror 29 is of the flat first surface type and fixedly mounted in said casing so that there exists a predetermined and fixed relation between the flat surfaces of the reflecting mirrors 29 and 31 and preferably, said last mentioned mirrors lie in parallel planes. Fixedly mounted within the casing near the lower and rearward portion thereof and centrally therein with respect to the centers of the screen 17 and the mirrors 29 and 31, is a reflecting mirror 27 of the flat and first surface type. The surface thereof is at an angle to the axis of projection which intersects the center of said mirror 27. The surface of this mirror is at approximately forty-five degrees to the axis of projection. The plane of the mirror also is substantially vertical. This mirror 27, therefore, is also at forty-five degrees to the screen, although both are vertically positioned.

The projector lens carried by the motion picture projector device, when positioned in the cabinet in its forward position, registers with the opening 41, and the projection axis will intersect the center of the mirror 27. The mirror 27 is proportionately smaller than the mirror 29 which, in turn, is proportionately smaller than the mirror 31, so that a regular and uniform progressive image enlargement is obtained from the projector to the screen and without the requirement that a relatively large distance be required between the projector and the screen for the obtaining of the desired enlarged images from the projector. The casing before mentioned can be constructed as a unit, according to fixed and determined dimensions and with the mirrors accurately and fixedly positioned therein whereby the whole may be readily mounted within a cabinet of the character indicated. Then the screen and projector may be associated with the cabinet for the completion of the device. This casing construction eliminates all stray light of whatsoever kind and description and any light except the image forming rays.

In the before mentioned copending application, of which this is a continuation-in-part, suitable ventilating means is provided but for clearness in the present instance, a duplication of this disclosure is omitted. However the construction contemplates the employment thereof, because with the electric lamp bulb illuminated type structures, there is considerable heat generated which should be vented. In addition to preventing any stray light from the projector illuminating system from being included in the image forming light rays, the casing eliminates any possibility of stray light from the energized radio tubes, which may or may not be considerable, depending upon the type of tube and the degree of shielding employed.

Access to the radio construction preferably is obtained through the rear of the cabinet, as is the common practice today in radio cabinets per se.

When a so-called daylight screen is employed, moving pictures may be shown in the daylight and to a better degree than heretofore obtained by employing a screen of said character without the cabinet and/or casing. Very good results can also be obtained during the evening by the use of such daylight screen in this device, even though the room in which the cabinet is positioned is ordinarily illuminated, at least to that degree commonly known as the subdued lighting of a room, so that the audience need not be required to sit in darkness, either in the day time or in the evening.

The cabinet doors 19 also may be readily arranged so as to eliminate exceptionally strong side light that might fall upon the screen and thus combine with the image and possibly diffuse the same. The door 51 when closed reduces the possibility of detracting the attention of the audience from the picture and in two respects— one, because it cuts off the sound of the motion picture projector device and second, it eliminates the attraction of the observer's attention to the illumination required for the operation of the projector device.

When the device is not in use, the doors 50, 51 and 19 are all closed and the radio, screen and projection device are properly protected and the closed cabinet, as will be apparent, constitutes a highly ornamental piece of furniture. The casing, since its opening 16 is closed by screen 17 and since it only includes the small opening 41, prevents the deposition of dust upon the mirrors or at least materially retards such accumulations. Should it become desirable to clean the mirrors, all that is necessary is to remove the screen 17, then access may be had to all of the mirrors through the opening 16. The casing also has the advantage that it protects the mirror system from injury or movement out of predetermined fixed positioning when service operators work upon the radio equipment or the projector equipment.

By using an odd number of mirrors the image is reversed in transit and reversal of the film in a moving picture projector is not required when positioned behind the screen.

In view of the predetermined fixed relation between the mirrors and screen and the definite location of the plate 21 and support 22, the lens 101 of the projection device does not require focusing for each successive set up or picture.

The result of this mirror system is that the clear cut but initially small image is reflected from mirror to mirror so that there is formed upon the screen 17 the perfect and enlarged image desired to be obtained from the image producer. The same is the equivalent of positioning the image producer at a great distance in front of the screen if it were opaque or at an equal distance behind the screen if it were translucent. There is thus obtained so far as the observer is concerned an apparent shortening of the usual required distance between the screen and the image producer. The advantage of this apparent reduction in distance is that the moving picture machine can be more successfully employed in small apartments and in so-called demonstrating cubby-holes or compartments for those who commercially sell moving picture film and the like to the householder customer.

Another advantage of the present invention is that obtained by putting the camera behind the screen and projecting through the same, to-wit, the exclusion of stray light from the eyes of the observer. This desirable quality objective is not only obtained with the present invention, but in addition thereto, the same is obtained without the requirement of the relatively long spacing distance heretofore required for such purposes.

For domestic or household purposes, it is impractical and undesirable to position the screen near one end of the room and have the observers or audience in the room backed up against the wall and then at the opposite end of the room have the projecting machine. The present invention permits the cabinet to be placed at one end of the room and the observers may sit in the room at any desired position with reference thereto and view the screen with the image thereon from any such position without interference from stray light and without requiring a large intervening distance between projector and screen in order to form the image of sufficient size to be readily viewable and satisfactory.

As heretofore suggested, positioning the screen against one wall and permitting the observers to sit in front of the screen at any desired position and positioning the image producer either in front of or behind the audience and throwing the light rays on to the screen has the inherent objection that stray light from the machine and stray light from the light rays forming a part of the image seriously interfere with the visual reception of the final image by the observer.

Another objection to such positioning is that the observers cannot freely move about the room or shift positions, because of possibility of crossing through the light rays forming the image. The present invention permits freedom of movement on the part of all of the observers, permits the image to be properly formed and of the desired size and reproduced on the screen in its desired clearances and sharpness, eliminates all stray light either from the machine itself or from the light rays forming the image and has the additional advantage of being not only arranged for compact reproduction, but the invention also has the advantage of being adaptable to a highly ornamental piece of furniture that is a source of pleasure and ornamentation in the home.

This invention also eliminates the use of long current supplying wires which heretofore have extended into the room and in moving over which observers or the operator frequently tripped and sometimes damaged the projector, although such tripping usually threw the projector out of focus or the image off the screen.

Inasmuch as a flat mirror system is employed, the angle of incidence equals the angle of reflection in each instance, so that the angle between each mirror and its line of impingement is equal to the angle made between each mirror and the line of reflection therefrom. To prevent "multiple" image effect the exposed face or first surface of the mirror constitutes the reflecting surface.

Since the initial formation of the image is of cone formation as it comes from the projector lens, the cone formation is not transmitted as a cylinder but the mirror system continuously enlarges the original conical arrangement thereby obtaining optically the same effect as if the projector were positioned at a considerable distance, either in front of or behind the screen to obtain the same image formed thereon as has heretofore been the practice.

Positioning the projector in the cabinet also serves to confine the noise of the projector to the cabinet, thereby providing quieter operation for the observer's convenience.

The invention claimed is:

1. In a cabinet having a vertical opening in its upper front portion, a screen for said opening, a closed light enclosing casing fixedly mounted in said cabinet and centrally positioned within the cabinet and having a mirror at its lower forward end and an opening near its lower rear end, an image forming projection device arranged to project the image into the casing for reflecting enlargement to and upon the screen, and means adjustably mounting the device upon and in the cabinet and arranged to permit partial withdrawal of the device for the purpose set forth and without interference between the casing and the projection device, said projection device when finally positioned for projection into the casing being positioned to one side of the lower center of the cabinet and closely adjacent the side and rear walls thereof.

2. In a cabinet having a vertical opening in its upper front portion, a screen for said opening, a closed light enclosing casing fixedly mounted in said cabinet and centrally positioned within the cabinet and having a mirror at its lower forward end, another mirror at its upper rear end and an opening near its lower rear end, an image forming projection device arranged to project the image into the casing for reflecting enlargement to and upon the screen, and means adjustably mounting the device upon and in the cabinet, and arranged to permit partial withdrawal of the device for the purpose set forth and without interference between the casing and the projection device, said projection device when finally positioned for projection into the casing being positioned to one side of the lower center of the cabinet and closely adjacent to the side and rear walls thereof, said casing including a third mirror in juxta-position to the casing opening, to prevent inversion of the image.

3. In a cabinet having a vertical opening in its upper front portion, a screen for said opening, a closed light enclosing casing fixedly mounted in said cabinet and centrally positioned within the cabinet and having a mirror at its lower forward end, another mirror at its upper rear end and an opening near its lower rear end, an image forming projection device arranged to project the image into the casing for reflecting enlargement to and upon the screen, and means adjustably mounting the device upon and in the cabinet and arranged to permit partial withdrawal of the device for the purpose set forth and without interference between the casing and the projection device, said projection device when finally positioned for projection into the casing being positioned to one side of the lower center of the cabinet and closely adjacent to the side and rear walls thereof, said casing including a third mirror in juxta-position to the casing opening, to prevent inversion of the image. The second and third mentioned mirrors being positioned immediately adjacent the rear wall of the cabinet and the first mentioned mirror and the screen being positioned at the front of the cabinet.

4. The combination of a cabinet, a motion picture projection device therein, a translucent screen, and a casing construction within the cabinet and interposed between the device and screen and including an odd and plural number of fixed mirrors, the casing enclosing the image forming light against stray light and the mirrors enlarging and reflecting the image forming light to and through the screen.

5. In combination, a cabinet including an exposed translucent screen for visualizing an image, an image producer within the cabinet, a system of angularly arranged reflecting mirrors for transferring the light rays from the producer to the back of the screen, means adjustably mounting said image producer within the cabinet and arranged for movement of the producer for exposure, said means including a longitudinally slidable platform, a producer supporting member superimposed relative to the platform, and handle means associated with the platform, said platform when slid longitudinally through force applied to the handle automatically rotating the projector supporting member in the sliding movement of the platform.

6. In combination, a cabinet having an opening therein, a screen completely closing said opening and supported by the cabinet, a multiple mirror system within the cabinet, a tubular light enclosing casing of irregular form and enclosing said multiple mirror system and closed by said screen at its largest open end, an image forming device concealed within the cabinet for projecting image forming rays into the other open end of the casing and having a predetermined projecting position, door means for the cabinet, and means independent of the door means and adjustably supporting said image forming device within said cabinet and arranged to expose the device and permit withdrawal movement thereof when the door means is opened.

7. The combination of a cabinet including a pair of superposed substantially vertical openings, a translucent screen for visualizing the image and completely closing the uppermost opening, an image producer within the cabinet in juxta position to the lowermost opening and behind the screen and laterally offset therefrom, a system of angularly arranged and progressive enlarging reflecting mirrors for transferring light rays from the producer to the back of the screen and for enlarging the image to dimensions greater than those normally obtainable by direct projection from the producer to the screen, door means for the second mentioned opening, and means adjustably supporting said image producer and arranged to expose the producer and permit withdrawal thereof when the door means is opened.

JAMES J. BRIGHT.
DUDLEY P. LEE.